United States Patent [19]

Raidel

[11] Patent Number: 4,529,224
[45] Date of Patent: Jul. 16, 1985

[54] WIDE BASE AIR SPRING SUSPENSION ASSEMBLY

[76] Inventor: John E. Raidel, Rte. 1, Box 400-M, Springfield, Mo. 65804

[21] Appl. No.: 502,496

[22] Filed: Aug. 29, 1983

Related U.S. Application Data

[63] Continuation of Ser. No. 266,006, May 21, 1981, abandoned.

[51] Int. Cl.³ .............................................. B60G 11/26
[52] U.S. Cl. .................................................... 280/711
[58] Field of Search ............... 280/683, 685, 688, 689, 280/702, 711, 713, 724, 725, 781, 788, 104

[56] References Cited

U.S. PATENT DOCUMENTS

| 2,903,256 | 9/1959 | Weiss ................................. | 280/711 |
| 3,252,538 | 5/1966 | Brueder ............................. | 280/711 |
| 3,565,456 | 2/1971 | Zoltok ............................... | 280/711 |
| 3,794,343 | 2/1974 | Hickman ........................... | 280/697 |
| 4,248,455 | 2/1981 | Manning ............................ | 280/711 |
| 4,273,357 | 6/1981 | Pashkow ............................ | 280/697 |

FOREIGN PATENT DOCUMENTS

| 643101 | 6/1962 | Canada ................................. | 280/711 |
| 650987 | 10/1962 | Canada ................................. | 280/711 |
| 2056634 | 5/1972 | Fed. Rep. of Germany ...... | 280/711 |
| 566667 | 9/1957 | Italy .................................... | 280/711 |
| 835413 | 5/1960 | United Kingdom ................ | 280/711 |

*Primary Examiner*—Joseph F. Peters, Jr.
*Assistant Examiner*—Ross Weaver
*Attorney, Agent, or Firm*—Rogers, Howell, Renner, Moore & Haferkamp

[57] ABSTRACT

A suspension assembly for supporting a vehicle chassis from at least one vehicle axle has a pair of outrigger bracket members extending into the wheel house area of the chassis, a bolster beam bolted to the axle with outrigger members extending into the wheel house area of the chassis and aligned with the outrigger brackets, and an air spring mounted and extending between each of the outrigger members and brackets to provide a suspension with an increased lateral distance between the spring members on opposite sides of the vehicle. Parallelogram stabilization of each axle is provided by a torque rod mounted at the point of attachment of the bolster beam to the axle with a torque rod having an offset and extending forwardly to a hanger assembly mounted in offset fashion to avoid interference with the vertical deflection of the bolster beam. A second embodiment is adapted for use on a steering axle and includes an integrally formed stool type axle seat with an outrigger extension member extending into the wheel well area, an inner extension member with bracket members to pivotally attach a sway bar, and a lower extension member with bracket members to pivotally attach a pair of torque rods. An upper frame extension member extends into the wheel well area and aligns with the outrigger member of the stool axle seat so that an air spring may be mounted and extend between them. A hanger assembly is mounted forwardly of the axle seat and has a U-shaped bracket to pivotally support the forward end of each of the two torque rods.

6 Claims, 7 Drawing Figures

WIDE BASE AIR SPRING SUSPENSION ASSEMBLY

This is a continuation of application Ser. No. 266,006, filed May 21, 1981, now abandoned.

BACKGROUND AND SUMMARY

One of the jobs of any suspension system is to mount a vehicle chassis to one or more axles with as wide as base as possible to enhance the stability of the chassis. At the same time, the suspension must mount to the chassis at one of its reinforced frame members to provide sufficient strength to support what can be very heavy loads. For most heavy duty vehicles, the undercarriage of the chassis generally takes the form of a rail type frame which extends longitudinally along the outboard sides of the chassis with one or more axles extending transversely underneath the frame members. The common practice in the art is for one portion of the suspension to be fixedly secured to the rail frame member, a second portion of the suspension to be fixedly secured to the axle, with one or more spring members and shock absorbers extending between the suspension members and frame. Almost without exception, the spring member is aligned with the rail frame member. Thus, the location of the frame predetermines the width of the base of support provided by the suspension.

The practice in the art of positioning the spring directly beneath the center line of the rail frame members also places constraints on the minimum height of the vehicle and maximum spring movement and hence load capacity. As can be appreciated, sufficient space must be provided between the rail frame member and the axle for mounting of the spring member and the movement of the spring from an unloaded to a fully loaded condition with some travel remaining to absorb shocks encountered during vehicle travel. As the space allowed for total spring movement is increased, the minimum height of the vehicle must be increased for any predetermined wheel and axle combination. While the capacity of the vehicle may be increased by providing increased stiffness or resistance to spring deflection, this results in a stiffer suspension action and hence a rougher ride.

Any suspension which is designed for use with a steering axle has still further factors to contend with, as it must not interfere with wheel movement throughout the turning radius, be somewhat more compact to accommodate the space required for the engine and transmission, and also provide a somewhat greater amount of stabilization because of the increased stresses encountered by a steering axle.

To solve these and other problems in the prior art, applicant has succeeded in developing a suspension system for both drive and trailer axles as well as steering axles which permits mounting of the springs outboard from the longitudinal rail frame members of the chassis. In the embodiment for drive or trailer axles, a bolster beam with an axle seat is clamped to the axle which has two rail members extending in outrigger fashion, one on either side of the axle. Rail type bracket members similarly extend in outrigger fashion from the rail frame of the chassis and are aligned with the bolster beam outrigger members. These brackets may be connected at their outer end to the wheel housing or other portion of the chassis available for mounting. Air springs are thus mounted between the bolster beam and the outrigger bracket members at a point somewhere near the center line of the wheels.

As can be appreciated, this provides a significantly wider base of support for the chassis and a base which coincides with the center line of the point of contact of the vehicle at each side thereof. Additionally, an offset hanger and torque rod assembly provide parallelogram stabilization of the axle which maintains the pitch of the axle constant as it deflects vertically during vehicle travel and which resists twisting of the axle as the brakes are applied. Furthermore, the dimensions and travel distance for the spring may be selected independently of the distance between the axle and frame, as long as the axle is not permitted to contact the frame during operation. As the springs are generally out in the wheelhouse area of the chassis, they can be increased in size through their cross-sectional area. Thus, this suspension provides a much wider base of stabilization both from side to side and fore to aft, and offers increased load carrying capacity with a smoother and safer ride.

In the embodiment applicant has developed for the steering axle, a novel stool type axle seat bolts directly to the axle and has an outrigger member extending beyond the rail frame of the chassis to mount a spring within the wheelhouse area. An outrigger bracket attaches directly to the rail frame of the chassis and extends upwardly above the stool type axle seat and aligned therewith to provide the mounting for the other end of the air spring member. Thus, the air spring mounts wholly outside the vehicle chassis frame and within the wheelhouse area. The stool type axle seat also provides a mounting position for a sway bar, a shock absorber, and brackets between which bushings extend for connecting a pair of torque rods to provide parallelogram stabilization. All of these functions are provided by this single, integrally formed stool type axle seat which has sufficient clearance to accommodate the wheel movement required of a steer axle. Its compact construction provides ease in installation and maintenance in addition to providing connection points for a number of other suspension components. This unique design further provides the wide base offered in applicant's other embodiment with its related advantages of greater capacity, smoother and safer ride, and greater stability. Applicant's wide base design is particularly suited to taller types of heavy duty vehicles, such as double decker buses which can experience uneven, changing loading at greater distances from the axles of the vehicles, resulting in serious stability problems in a vehicle carrying a very fragile cargo.

A fuller understanding of applicant's invention may be gained by referring to the drawings and description of the preferred embodiment which follows.

DETAILED DESCRIPTION OF THE PREFERRED EMBODIMENT

Figure 1:
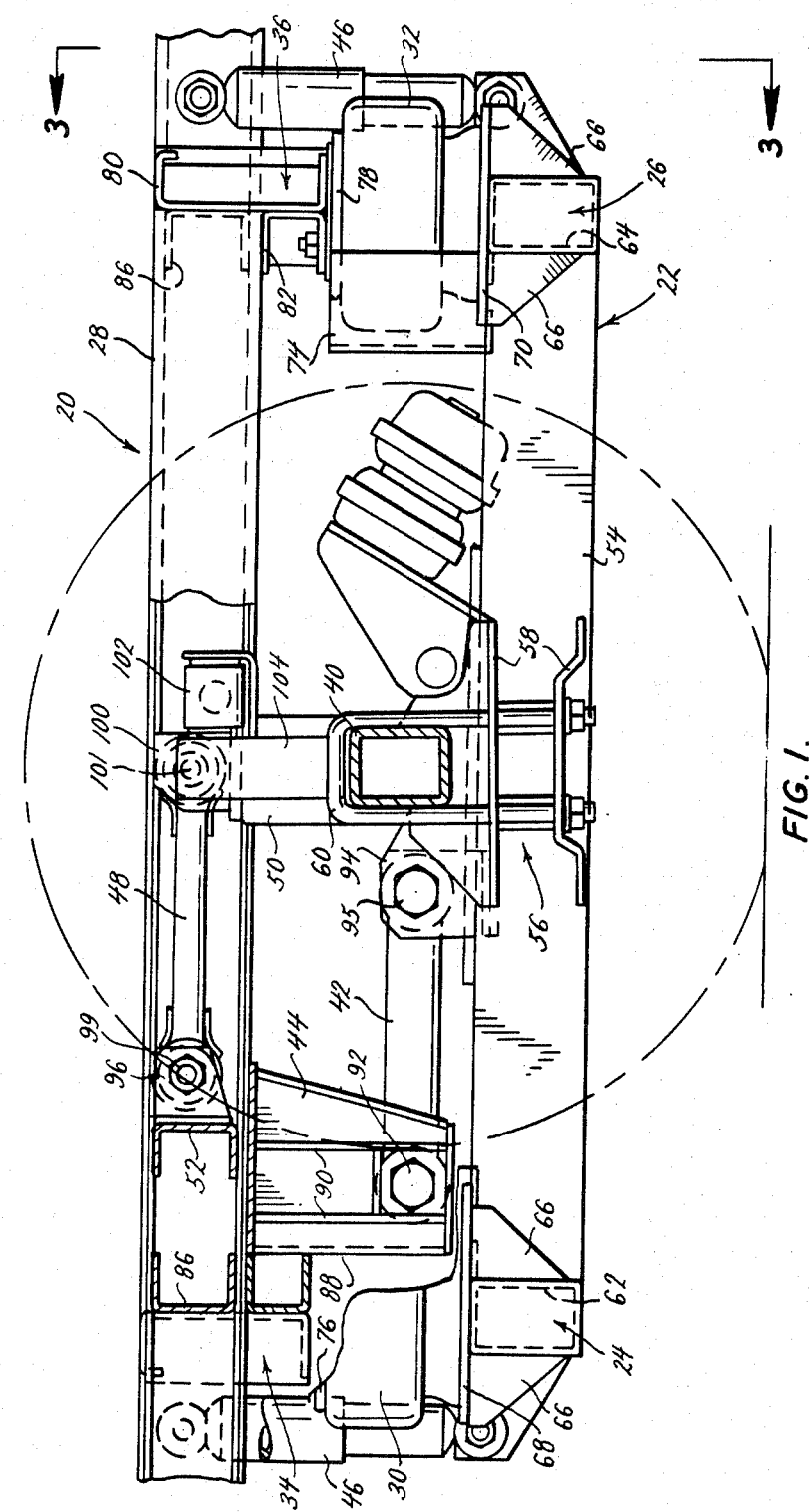
FIG. 1 is a side view of applicant's wide base air spring suspension for use with a trailer axle.
Figure 2:
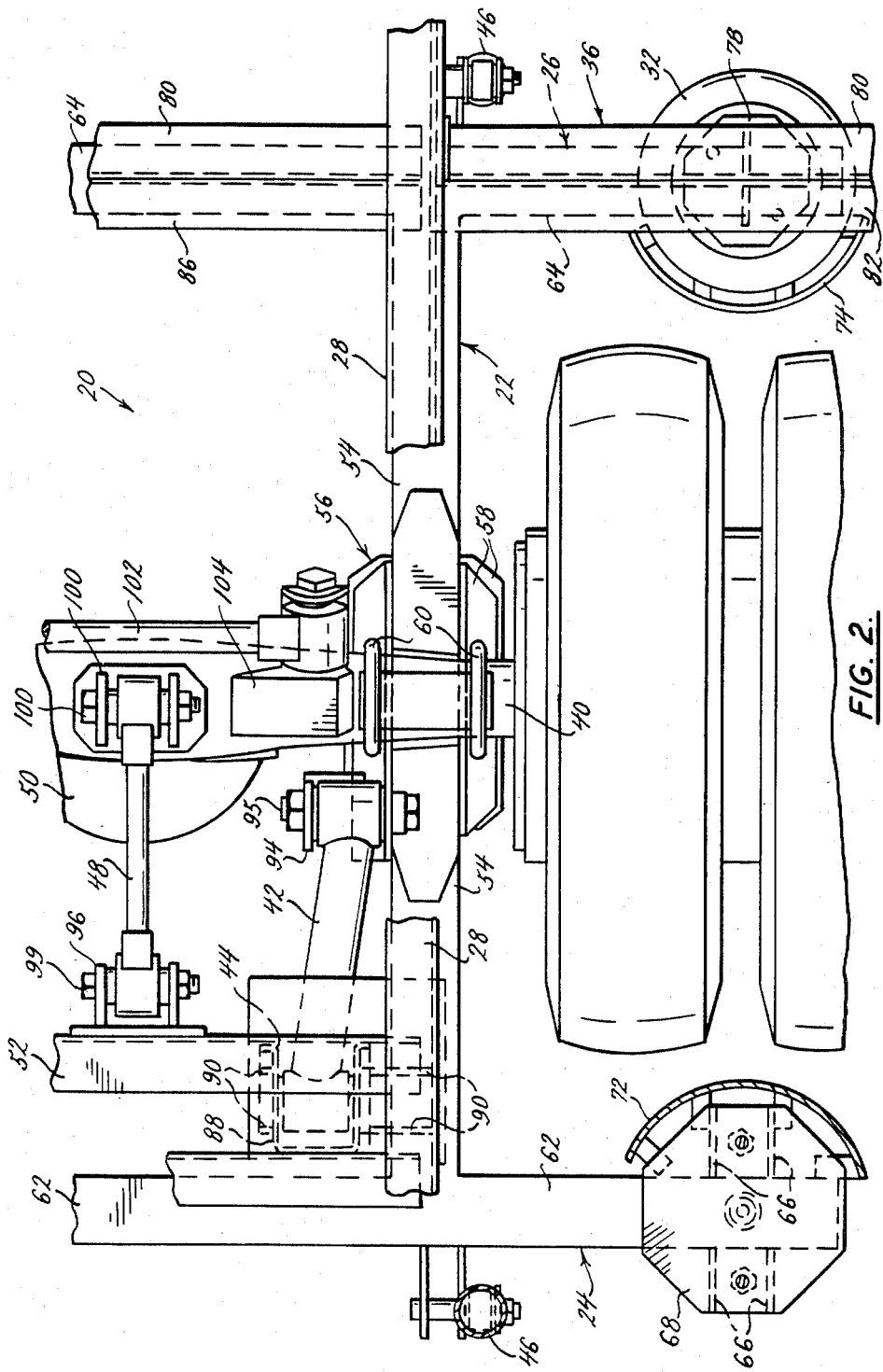
FIG. 2 is a top view of the suspension shown in FIG. 1.
Figure 3:
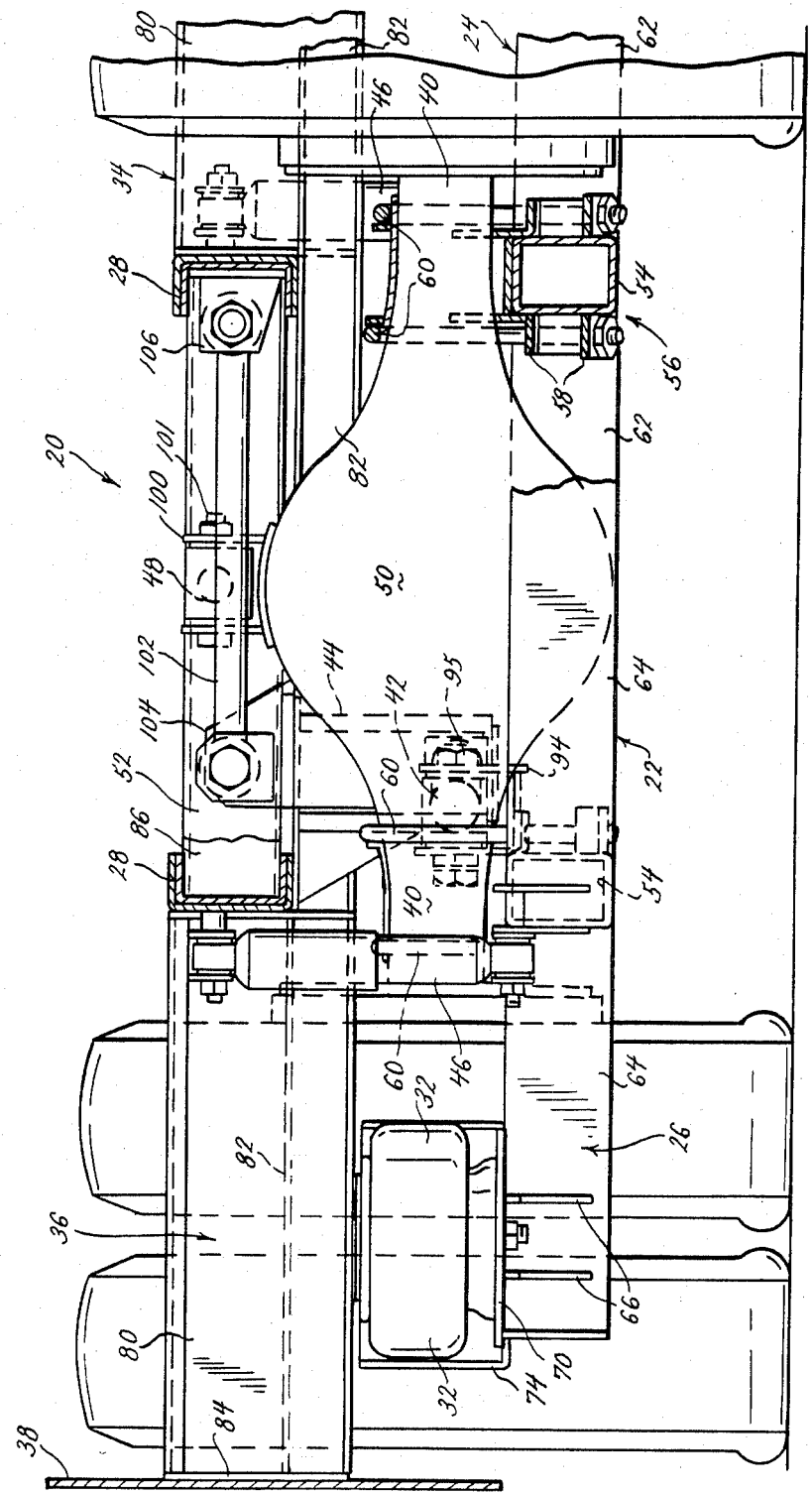
FIG. 3 is a rear view taken along the plane of line 3—3 in FIG. 1.

Applicant's first embodiment of his wide base air spring suspension 20 is shown in FIGS. 1-3 and generally includes a bolster beam assembly 22 with outrigger members 24, 26 extending laterally outboard of the upper rail frame 28. The outrigger members 24, 26 form part of the continuous rails which extend transversely underneath the vehicle and attach to a duplicate suspension (shown in FIG. 3) on the opposite side of the vehicle. As can be appreciated, each side of the vehicle requires a separate suspension system, and it is to be understood that applicant is describing in detail only one such suspension. Near the outer extremity of outrigger members 24, 26, air springs 30, 32 are mounted and extend between the outrigger members 24, 26 and corresponding frame extension members 34, 36 extending outwardly from upper rail frame 28 and aligned with the outriggers 24, 26. Frame extension members 34, 36 are secured to the wheel well 38 at their outer extension for added support.

Axle 40 is bolted to bolster beam assembly 22 near its midpoint and a torque rod 42 is pivotally attached to and extends between bolster beam assembly 22 and a hanger 44, the hanger 44 being offset from bolster beam assembly 22 for clearance purposes and to accommodate increased forward placement of air spring 30. One or more shock absorbers 46 extend between bolster beam assembly 22 and upper rail frame 28 to further dampen the suspension system. A second torque rod 48 is pivotally attached to and extends between the rear axle housing 50 and a cross frame member 52 to complete the parallelogram stabilization for the axle 40. As is apparent from the drawings, the air springs 30, 32 are mounted substantially outboard from the upper rail frame 28 and provide an increased lateral distance between the corresponding air springs (shown in FIG. 3) on the opposite side of the vehicle as well as increased fore to aft separation of air springs 30, 32. Applicant will now describe his first embodiment 20 in more detail.

As shown in FIG. 1, the bolster beam assembly 22 includes a longitudinal beam member 54 which runs directly below upper rail frame 28 and has an axle seat 56 near its midpoint. Axle seat 56 includes upper and lower bracket members 58 with U-bolts 60 fastening axle 40 thereto. Outrigger members 24, 26 include rectangularly shaped rails 62, 64 which extend transversely and parallel axle 40 across the width of the vehicle. Rectangular rails 62, 64 are secured such as by welding at the forward and rearward ends of longitudinal beam member 54. Near the outboard end of each outrigger member 24, 26, an air spring is mounted with strengthening webs 66 extending between base plates 68, 70 and rectangular rails 62, 64, respectively. Around each air spring 30, 32 a shield 72, 74 is mounted to prevent damage to the air springs 30, 32 as might be caused by rocks or other debris being thrown by the tires during vehicle use. Shields 72, 74 are secured to and extend upwardly from base plates 68, 70 to top plates 76, 78.

Frame extension members 34, 36 include a taller C-shaped frame member 80 which is attached to and extends outwardly from upper rail frame 28 and a smaller C-shaped frame member 82 bolted to the top of plate 78 and extending the full width of the vehicle to the suspension on the opposite side thereof underneath upper rail frame 28 and the corresponding upper rail frame (shown in FIG. 3) on the opposite side of the vehicle. An end plate 84 or other similar bracket or the like may be used to secure frame extension members 34, 36 to the outboard wall of the wheel housing, as is known in the art. As is best shown in FIG. 3, another C-shaped cross beam 86 extends between upper rail frame 28 and the corresponding upper rail frame on the opposite side of the vehicle. This cross beam 86 helps strengthen the frame 28 at the point of attachment of frame extension members 34, 36.

A hanger assembly 44 is secured to and suspended from upper rail frame 28 inboard of the longitudinal center line thereof and includes a U-shaped bracket member 88 and a plurality of strengthening webs 90. This is best shown in FIG. 2. An eccentric bolt 92 is used to pivotally secure an end of torque rod 42 which is formed at an angle as shown in the drawings. The axle seat brackets 58, an inboard mounting bracket 94, and bushing 95 provide the mounting for the opposite end of torque rod 42, such that the torque rod extends between a fixed frame member or hanger 44 and the bolster beam assembly 22. A center torque rod 48 is similarly pivotally mounted at its ends with mounting bracket 96 secured to cross beam member 52 and mounting bracket 100 mounted on the top of rear axle housing 50, and bushings 99, 101. The two torque rods 42, 48 form a parallelogram to maintain the pitch of axle 40 as the tire and wheel deflect during vehicle movement. A sway bar 102 has an end pivotally mounted to a mounting block 104 welded or otherwise secured to the sloping surface of rear axle housing 50 with its other end rotatably mounted to a mounting bracket 106 mounted to the inside of the upper frame member on the opposite side of the vehicle. This is best shown in FIG. 3.

Figure 5:
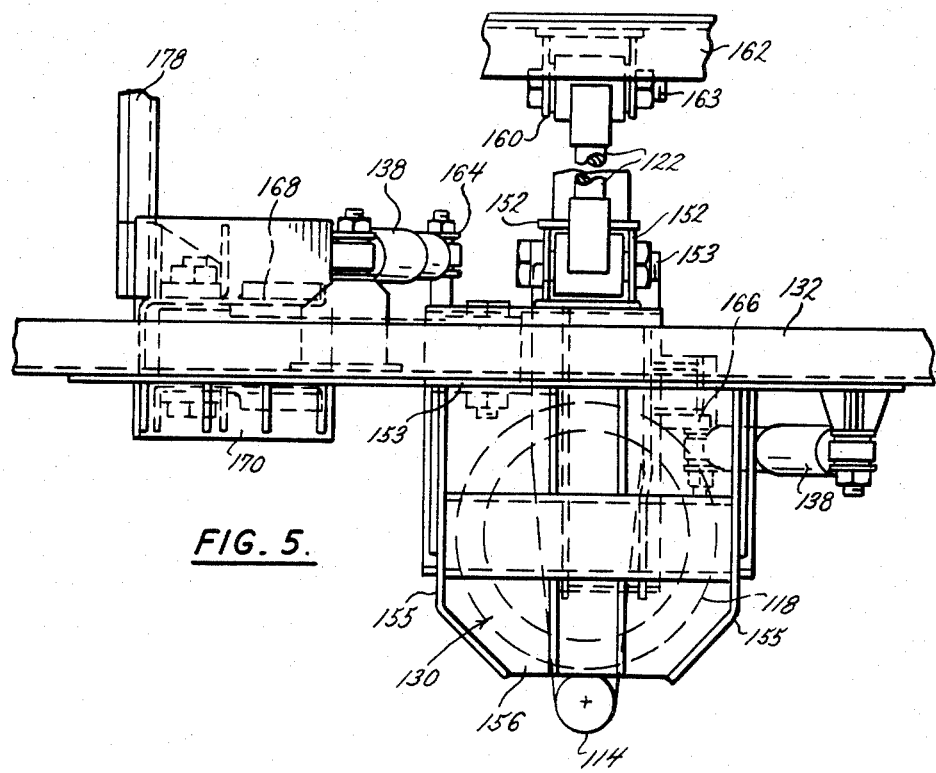
FIG. 5 is a top view of the suspension shown in FIG. 4.
Figure 4:
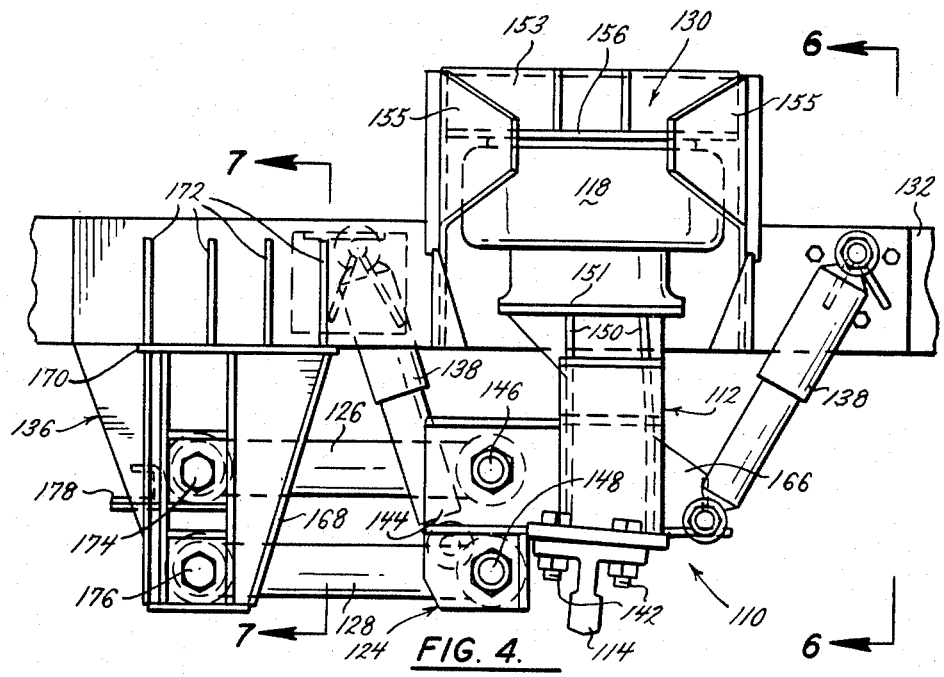
FIG. 4 is a side view of a second embodiment of applicant's suspension for use with a steer axle with the tire and wheel not shown.
Figure 6:
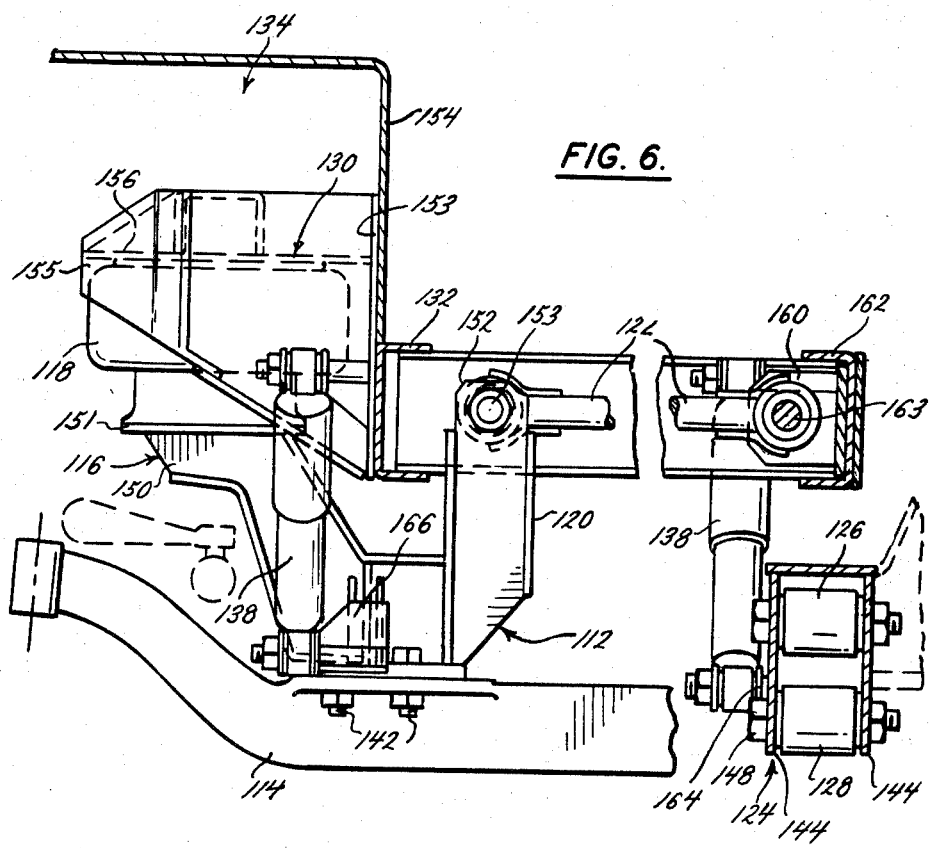
FIG. 6 is a rear view taken along the plane of line 6—6 in FIG. 4.

Applicant's second embodiment 110 is shown in FIGS. 4-7 as used with a steering axle to provide the same benefits and features in a compact construction with clearances for movement of the steering gear. As is best shown in FIG. 6, an integrally formed stool type axle seat 112 bolts to axle 114 and has an outrigger member 116 for supporting the base of an air spring 118 with an inboard extension 120 for pivotally attaching to a sway bar 122. As is shown in FIG. 4, the stool type axle seat 112 also has a lower bracket assembly 124 for pivotally securing an end of torque rods 126, 128. An upper spring bracket 130 is attached to and extends outwardly from a frame member 132 and the inside of wheel house 134 for mounting the upper end of air spring 118. A hanger bracket 136 is secured to and extends downwardly from frame member 132 and provides for the pivotal mounting of the forward end of torque rods 126, 128. Shock absorbers 138 are mounted to the stool type axle seat 112 and various brackets are secured to frame member 132. As is seen from this general description, applicant's second embodiment 110 provides for the outrigger mounting of air springs 118 with an integrally formed, compact stool type axle seat 112, with parallelogram stabilization of the axle 114 by torque rods 126, 128 also mounted to axle seat 112 with dampening provided by shock absorbers 138 secured at an end to axle seat 112, as well. Sufficient room is provided for movement of various steering carriage members as partially shown in dotted lines in FIG. 6. Having generally described applicant's second embodiment 110, more detailed description of the various elements thereof follow.

As shown in FIGS. 4–6, the stool type axle seat 112 is bolted to steering axle 114 by bolts 142, with lower bracket assembly 124 having a pair of forwardly extending bracket members 144 which are spaced apart to mount between them an end of each torque rod 126, 128 with bushings 146, 148. Similarly, outrigger member 116 includes a pair of outrigger bracket members 150 which are attached to and support bottom plate 151 of air spring 118 beyond the vertical axis of rail frame member 132. Also, inboard extension 120 includes a pair of brackets 152 which are spaced apart to mount an end of sway bar 122 with bushing 153. The other end of sway bar 122 is rotatably mounted to bracket 160 which is welded or otherwise secured to the inside of rail frame member 162 by bushing 163 at the opposite side of the vehicle. Axle seat 112 also has mounting brackets 164, 166 for mounting shock absorbers 138 therefrom, the shock absorbers 138 extending between axle seat 112 and rail frame member 132.

Upper spring bracket 130 includes a back plate 153 welded or otherwise secured to the inside wall 154 of wheel well 134 with side brackets 155 extending outward to surround top plate 156 and a substantial portion of air spring 118. Brackets 155 form a spring guard to protect it from puncture by debris and the like thrown up by the tires.

Figure 7:
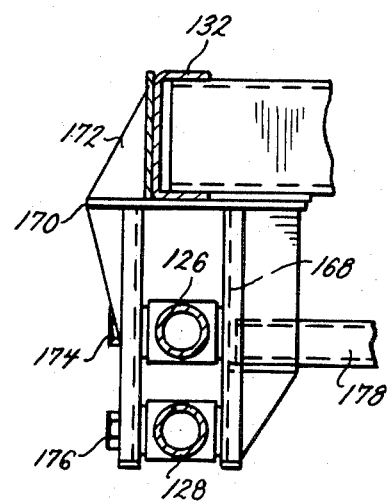
FIG. 7 is a partial cross-sectional view taken along the plane of line 7—7 in FIG. 4 and detailing the mounting of the torque rods.

A hanger assembly 136 extends downwardly from rail frame member 132 and includes a U-shaped bracket member 168 mounted to and extending beneath a top plate 170, with gusset plates 172 strengthening and supporting same. Bushings 174, 176 extend between the legs of the U-shaped bracket 168 and mount the forward ends of torque rods 126, 128. This is best shown in FIG. 4 and FIG. 7. A cross bracket member 178 is mounted to the hanger 136 and extends to a hanger (not shown) in the suspension on the opposite side of the vehicle.

Operation

Applicant's first embodiment 20 is adapted for use on a trailer axle, driving axle, or other nonsteering type axle. Applicant's invention provides for an increased distance between the spring members of the suspensions on opposite sides of the vehicle over those suspensions available in the prior art. Each suspension on each side of the vehicle has a bolster beam assembly bolted to the axle with outrigger members extending outwardly beyond the rail frame underneath the chassis of the vehicle to provide mounting positions for the air springs. Frame extension members extend outwardly from the rail frame to provide the upper mounting point for the air springs such that the air springs can be substantially aligned with the center line of the wheels. Moving the air springs out beyond the rail frames and into the wheel wells gains additional space and permits use of larger air springs than is possible in suspensions mounting the air springs directly beneath the rail frames. Thus, increased capacities may be accommodated and a smoother and safer ride provided through the use of larger spring members.

Applicant utilizes parallelogram stabilization of the axle to maintain the pitch of the axle as the axle deflects vertically with respect to the frame. This parallelogram stabilization is achieved by the torque rods mounted at the center of the axle and at each end of the axle. As the bolster beam provides an increased separation between the air springs and the axle necessary to surround the tires, it becomes a problem to secure a torque rod adjacent the end of the axle and be substantially the same length and angular orientation as the torque rod at the center of the axle without limiting the vertical travel of the bolster beam. To eliminate this problem, applicant has offset the hanger assembly and provided a torque beam with an angular offset so that the hanger does not interfere with movement of the bolster beam. Thus, full parallelogram stabilization of the axle can be achieved in a suspension which has increased separation and longitudinal spacing as well as lateral spacing between air spring members as is necessary to mount them outboard of the rail frame of the vehicle chassis.

In applicant's second embodiment, the air spring is mounted outside of the center line of the rail frame and into the wheel house or wheel well area which provides increased stabilization, without interfering with the movement of the steering axle or any of the supporting struts, guide arms, or other assemblies of the steering mechanism. With outboard mounting of the air spring, an air spring of increased capacity and dimension may be used to provide a safer and smoother ride; with parallelogram stabilization of the axle to prevent axle rotation as the brakes are applied and also maintain the pitch of the axle as it deflects vertically with respect to the frame which provides for a solid feel in the steering of the vehicle. With the stool type axle seat, installation is enhanced as it serves as a connection point for most of the suspension's components, including shock absorbers, torque rods, the air spring, axle, and sway bar. Furthermore, with the outrigger mounting of the air spring, an increased base of stabilization is provided as the distance between air springs on opposite sides of the vehicle is increased over those suspensions of the prior art with air springs mounted directly beneath the rail frame members, as is customary.

In both embodiments, the outrigger extension mounting the top of the air spring may extend across to the outer wall of the wheel well or wheel house area and be attached thereto to help support the air spring and increase the stability of its mount.

Various changes and modifications may be made to applicant's invention as would be apparent to those skilled in the art. However, any of these changes or modifications are included within the scope of applicant's teaching and he intends that this invention be limited only by the scope of the claims appended hereto.

I claim:

1. In a suspension assembly for vehicles having a longitudinal frame, an axle, and a wheel, the suspension assembly at each side of the frame comprising the combination of: a bolster beam extending longitudinally of and lower than the frame; axle seat means to fixedly mount the axle on and over the bolster beam; outrigger mount means on the bolster beam below the level of the frame, and disposed longitudinally of the bolster beam to support a spring in outrigger fashion with respect to the frame; a torque rod for connecting the axle to the frame; a rocking means mounting an inner end of the torque rod on the axle seat means adjacent to the bolster beam but laterally of the frame; the torque rod extending from adjacent the axle seat means toward, and having its outer end terminating short of, the outrigger mount means, and a hanger disposed adjacent but to one side of the bolster beam for attaching the outer end of the torque rod to the frame adjacent to and over the bolster beam but laterally of the frame to provide an operating force-transmitting connection between the frame, the bolster beam and the axle mounting means, a second torque rod of length substantially equal to the length of the first one, means disposed between the axle and the frame for pivotally mounting the second torque rod rockably to the frame and the axle, the bolster beam extending fore and aft of the axle, there being similar outrigger mount means at both ends thereof and similar springs mounted in outrigger fashion at both ends.

2. In the assembly of claim 1, a transverse rail beam connected to the bolster beam and extending across the vehicle for connection to a like bolster beam on the other side of the vehicle, the transverse beam being located longitudinally beyond the rocking means for attaching the outer end of the first torque beam to the frame whereby not to obstruct the movement of the bolster beam by contact with the said rocking means.

3. In the assembly of claim 1, the second torque rod being located toward the middle axis of the vehicle from the bolster beam.

4. The assembly of claim 1 wherein the outrigger mount means disposes the springs in general alignment with the wheels of the vehicle, the springs being air springs and wherein there is a shield between the air springs and the wheels.

5. The suspension of claim 1 wherein there is a sway bar pivotally connected between the axle and frame of the vehicle and extending transversely of the frame.

6. In the assembly of claim 1 wherein the springs mounted on the outrigger mount means are air springs.

* * * * *